H. W. HITZEMANN.
POTATO DIGGER.
APPLICATION FILED NOV. 13, 1912.

1,115,537.

Patented Nov. 3, 1914.
2 SHEETS—SHEET 1.

WITNESSES:

INVENTOR
Herman W. Hitzemann,
By E. C. Crawford,
Att'y-

H. W. HITZEMANN.
POTATO DIGGER.
APPLICATION FILED NOV. 13, 1912.
1,115,537.
Patented Nov. 3, 1914.
2 SHEETS—SHEET 2.
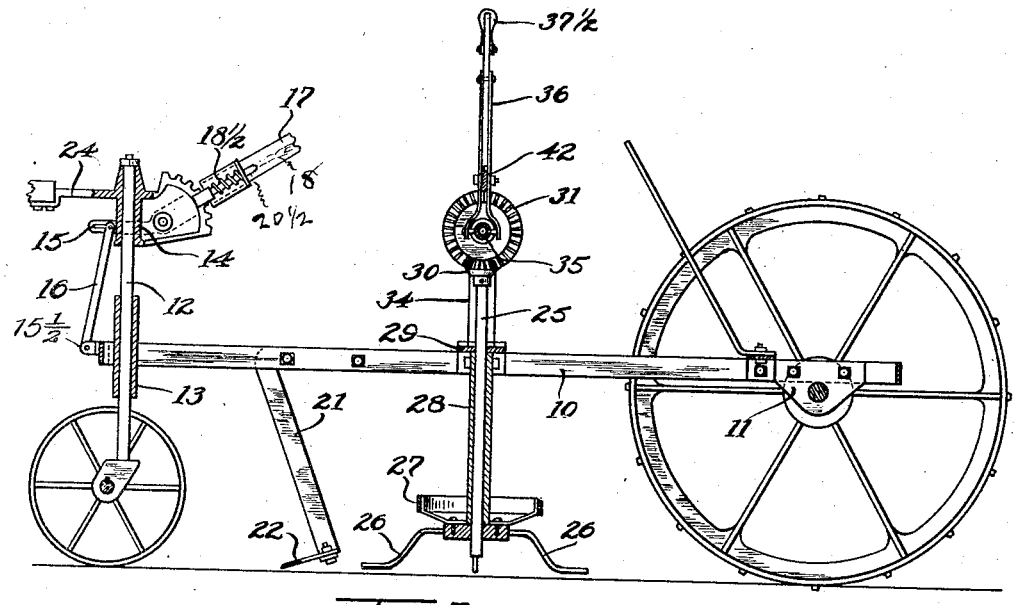
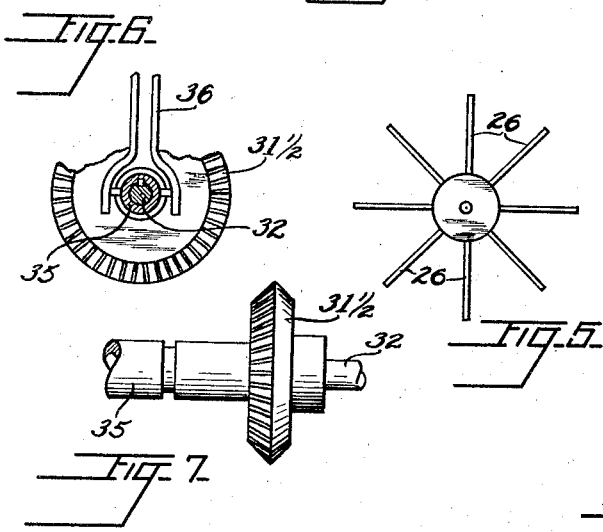
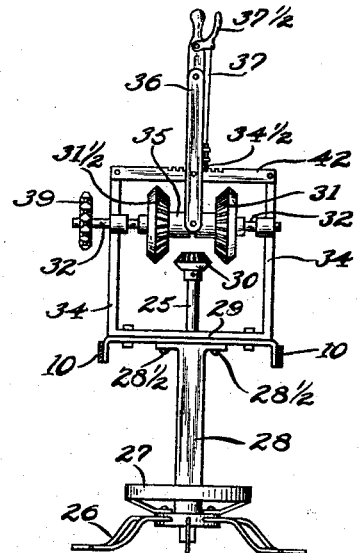

UNITED STATES PATENT OFFICE.

HERMAN W. HITZEMANN, OF ROSELLE, ILLINOIS.

POTATO-DIGGER.

1,115,537. Specification of Letters Patent. Patented Nov. 3, 1914.

Original application filed June 4, 1912, Serial No. 701,593. Divided and this application filed November 13, 1912. Serial No. 731,220.

*To all whom it may concern:*

Be it known that I, HERMAN W. HITZEMANN, a citizen of the United States, residing at Roselle, in the county of Du Page and State of Illinois, have invented a certain new and useful Potato-Digger, of which the following is a specification.

Figure 1:
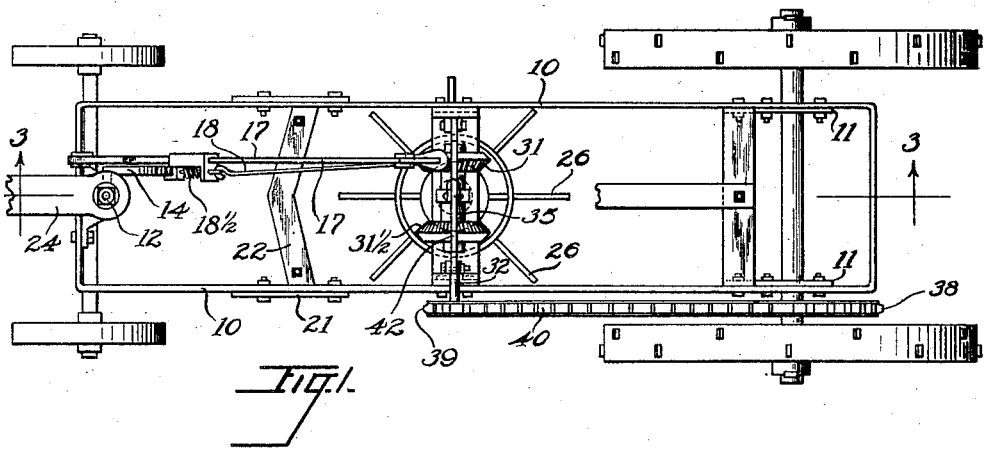
Figure 2:
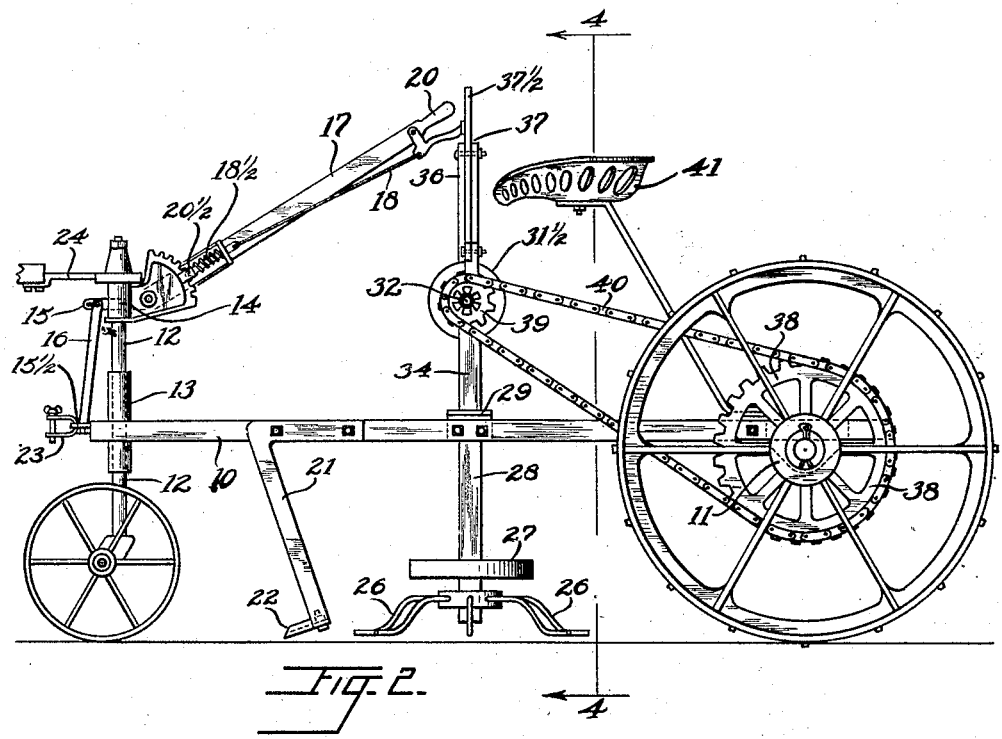

My invention relates to improvements in potato diggers, in which laterally revolving radial arms, secured to a disk, operate in conjunction with a plowshare; and the objects of my invention are:—1, to loosen and raise the dirt of potato hills, together with the potatoes therein; 2, to break up such dirt, freeing the potatoes therefrom, and to throw the potatoes in a lateral direction upon the surface of the ground beside the course of the digger as it moves across the field. I attain these objects by means of the machinery illustrated in the accompanying drawings, in which:

Figure 1 is a plan view of my invention, showing it as ready to have a team hitched thereto and operate it;—Fig. 2 is a side elevation of the same;—Fig. 3 is a vertical section on the line 3—3 of Fig. 1, and viewed in the direction of the arrows;—Fig. 4 is a vertical section on the line 4—4 of Fig. 2. Fig. 5 shows detailed views of the radial arms and their connections;—Fig. 6 shows detailed views of the shifter and its relative parts. Fig. 7 is an elevation showing the sleeve upon which the vertical gears are mounted.

Like numerals refer to like parts throughout the several views.

The present application was filed in combination with another application which, on division subsequently made, was allowed as Patent No. 1,070,129 under the title frame-adjusting mechanism, and of the date August 12, 1913.

Referring to the drawings;—10 is a double bar connecting the front and rear axles of the digger; 11—11 are brackets securing the bar on the rear axle. The axle passes through these pivot-wise and is rigidly secured at its ends to the rear wheels.

12 is a vertical shaft, secured at its lower end to the forward axle; 13 is a sleeve, bolted to the front end of the double bars; 14 is a bracket bolted upon the upper, enlarged part of the shaft, 12, and bearing the segment of a gear or quadrant; 15 denotes the lower end of the lever 17, extending in front of the shaft; 16 is a rod, pivoted on the lever, 17, and on the lug, $15\frac{1}{2}$ the latter being secured on the front end of the double bars; 17 is a lever, pivoted on the bracket 14, at a point indicated. This lever extends in front of the shaft, 12, and is pivoted to the rod, 16, as stated above.

18 is a rod which is pivoted to the lever, 17. The lever 17 has a hand hold 20. The rod, 18, is also pivoted to the plug, $20\frac{1}{2}$.

$18\frac{1}{2}$ is a spiral spring of the usual common form, and it is secured about the plug $20\frac{1}{2}$. This plug is fitted to engage with the cogs of the quadrant which is a part of the bracket 14.

21—21 are bars, bolted to the bars 10, and to the plowshare, 22.

The front end of the lug, $15\frac{1}{2}$ is slotted vertically to receive the clevis, 23, to which a double-tree may be attached.

The top of the shaft, 12, bears the casting, 24, rigidly secured thereon. To this a pole is attached. The clevis, double-tree, and pole are each of well known common construction, designed for hitching on a team to draw the digger.

25 is a shaft, to the lower part of which are rigidly secured the radial arms, 26, and the hoop, 27. The sleeve, 28, is secured on the bracket, 29, which in turn is bolted to the double bars 10. The shaft, 25, passes through this sleeve. The beveled gear, 30, is secured horizontally on the top of the shaft 25. The beveled gears, 31 and $31\frac{1}{2}$, are secured on the pivot, 32, not rigidly, but in the manner shown below. This pivot is geared in the sides of the frame work, 34, which is bolted to the sleeve, 28, at the points $28\frac{1}{2}$. The gears, 31 and $31\frac{1}{2}$ are rigidly secured on the sleeve, 35. This sleeve is mounted on pivot, 32, and is short enough to allow it to be moved thereon laterally. The upper bar, 42, of the frame work, 34, has certain vertical notches, $34\frac{1}{2}$. The lever 36 is pivoted on the sleeve, 35, and is swung laterally on a pivot attaching it to the bar, 42. At its lower end this lever is pivoted on the sleeve, 35.

37 is a locking device of well known, common construction having a hand-hold, $37\frac{1}{2}$, and being pivoted to the lever, 36 and being formed pin-like at its lower end, so it can be dropped into the notches $34\frac{1}{2}$, in the bar, 42, by manipulating the hand-hold $37\frac{1}{2}$.

The vertical gears above described are so located that they can be made to engage with the horizontal gear, 30, by the action of the lever, 36.

The sprocket wheel, 38, is rigidly secured to the left rear wheel of the digger. The sprocket wheel, 39, is rigidly secured on the left end of the pivot, 32. The sprocket chain, 40, connects with the wheels. A seat, 41, for the driver, is bolted to the cross bar, which is bolted to the double bars 10 near their rear end, and is so located that the driver has within his reach the handles of the levers 17 and 36.

To operate my invention a team is hitched to the digger by means of the double-tree and pole above named, which are both of well-known common construction; the driver, mounted on his seat employs the handle, 17, with its spiral spring, 18½, to depress the plowshare to the right level to bring its point below the potatoes in the hills. The shifting mechanism, 34½, is disengaged from the cross piece, 42, of the frame-like construction. The upright lever, 36, is moved toward the left, and thus the left vertical gear, 31½, engages with the horizontal gear, 30. The team is started, the plow turns upward the potato hills, and the sprocket wheels cause the left vertical gear to revolve, and this, engaging with the horizontal gear above shown, the latter revolves, and by its connection above shown, causes the radial arms to revolve, which pulverize the dirt and throw the potatoes outside upon the surface of the ground. To discontinue the operation of the digger, first, raise the plowshare a sufficient height above the surface of the ground and secure it thus by means of the quadrant gear and its connection above shown, then by disengaging the above gears, the revolutions of the radial arms will cease, and placing the vertical shifting lever at exactly the middle point of the bar, 42, on which the lever is moved, and securing it by its clutch, the vertical gears will revolve as the sprocket wheels go around, when the digger is drawn forward, but the rest of the radial mechanism will remain stationary.

Sometimes it may be necessary to reverse the action of the radial arms. To do this, the right gear is moved into engagement with the horizontal gear, when it is obvious the reverse action will occur.

I am aware that other potato diggers have been invented which will turn up the ground of the potato hills, but I contend that none of them will free the potatoes from the ground, but that all of them will leave the potatoes mixed up with the ground.

What I claim, therefore, as my invention, and desire to secure by Letters Patent of the United States is:—

In a potato digger, a main frame, front and rear wheels supporting the main frame, a vertical shaft mounted in the main frame intermediate the front and rear wheels, a disk secured to the lower end of the vertical shaft and having radially extending free arms, a gear secured to the upper end of the shaft, a horizontally arranged shaft mounted in brackets supported by the main frame, a shiftable sleeve on the horizontally arranged shaft, gears mounted on the sleeve, a lever engaging the sleeve between the gears and adapted to shift the sleeve so as to bring either gear thereon into engagement with the gear on the vertically arranged shaft, a sprocket wheel on the horizontally arranged shaft, another sprocket wheel on one of the wheels of the digger and a sprocket chain connecting the sprocket wheels, substantially as described.

In witness whereof, I hereby subscribe my name and affix my seal to the foregoing specification at Chicago, Illinois, this 8th day of November, A. D. 1912.

HERMAN W. HITZEMANN. [L. S.]

Witnesses:
 MARSHALL AMBERG,
 JOHN H. HOGLUND.